(12) United States Patent
Howes et al.

(10) Patent No.: US 8,496,026 B2
(45) Date of Patent: Jul. 30, 2013

(54) VALVE

(75) Inventors: Jonathan Sebastian Howes, Cambridge (GB); James Macnaghten, Cambridge (GB)

(73) Assignee: Isentropic Limited, Cambridge (GB)

( * ) Notice: Subject to any disclaimer, the term of this patent is extended or adjusted under 35 U.S.C. 154(b) by 301 days.

(21) Appl. No.: 12/747,467

(22) PCT Filed: Dec. 11, 2008

(86) PCT No.: PCT/GB2008/004087
§ 371 (c)(1),
(2), (4) Date: Aug. 20, 2010

(87) PCT Pub. No.: WO2009/074800
PCT Pub. Date: Jun. 18, 2009

(65) Prior Publication Data
US 2010/0300554 A1    Dec. 2, 2010

(30) Foreign Application Priority Data

Dec. 11, 2007 (GB) .................................. 0724158.1
Feb. 29, 2008 (GB) .................................. 0803794.7
Feb. 29, 2008 (GB) .................................. 0803795.4
Jul. 24, 2008 (GB) .................................. 0813571.7

(51) Int. Cl.
*F16K 47/08* (2006.01)
*F16K 3/32* (2006.01)
*F16K 3/00* (2006.01)

(52) U.S. Cl.
USPC ................... 137/625.3; 137/625.33; 251/326; 251/206

(58) Field of Classification Search
USPC ................. 251/89, 175, 206, 326; 137/625.3, 137/625.33
See application file for complete search history.

(56) References Cited

U.S. PATENT DOCUMENTS 1,343,576 A    6/1920    Neilson
1,740,626 A    12/1929   Petrelli (Continued)

FOREIGN PATENT DOCUMENTS

CN    101046257    10/2007
DE    10 052 195    3/1959

(Continued)

OTHER PUBLICATIONS

International Search Report and Written Opinion from corresponding International application No. PCT/GB2008/004087, 10 sheets, mailed Apr. 23, 2009.

(Continued)

*Primary Examiner* — Eric Keasel
*Assistant Examiner* — Kevin Barss
(74) *Attorney, Agent, or Firm* — Lempia Summerfield Katz LLC

(57) ABSTRACT

A valve comprising a first pan (10') defining a first array of apertures (20') and a second part (50) defining a second array of apertures (60'), the first pan (10') being moveable relative to the second part (50) between a first configuration in which passage of a fluid through the valve is substantially prevented and a second configuration in which passage of fluid is allowed. In one embodiment, the first pan (10') comprises a flexible plate-like member configured to engage a sealing face of the second part (50) when in the second configuration and lock in the second configuration in response to a pressure differential across the valve. The plate-like member is sufficiently flexible to conform to a profile of the sealing face in response to a pressure differential across the valve.

13 Claims, 18 Drawing Sheets

U.S. PATENT DOCUMENTS

| Patent No. | | Date | Inventor | Ref |
|---|---|---|---|---|
| 2,858,851 | A | 11/1958 | Holl | |
| 3,635,252 | A * | 1/1972 | Botnick | 137/637 |
| 3,642,385 | A | 2/1972 | McMahon | |
| 3,645,398 | A | 2/1972 | Fiocco | |
| 4,415,139 | A * | 11/1983 | Potts | 251/62 |
| 4,516,606 | A * | 5/1985 | Worley | 137/625.3 |
| 4,718,455 | A | 1/1988 | Dussourd et al. | |
| 5,054,522 | A | 10/1991 | Kowanz et al. | |
| 5,427,146 | A * | 6/1995 | Bakken et al. | 137/625.3 |
| 5,837,394 | A * | 11/1998 | Schumm, Jr. | 429/402 |
| 6,561,483 | B2 | 5/2003 | Nakagawa | |
| 6,666,978 | B2 * | 12/2003 | Steinel | 210/808 |
| 6,701,876 | B2 | 3/2004 | Youqing | |
| 6,877,964 | B2 * | 4/2005 | Burns et al. | 417/410.1 |
| 7,051,964 | B2 * | 5/2006 | Van Der Zanden | 241/275 |
| 7,059,299 | B2 * | 6/2006 | Clark | 123/337 |
| 2003/0165391 | A1 | 9/2003 | Kim | |
| 2006/0033061 | A1 * | 2/2006 | van Mast et al. | 251/93 |
| 2010/0186720 | A1 | 7/2010 | Rochier | |

FOREIGN PATENT DOCUMENTS

| | | |
|---|---|---|
| DE | 1 221 867 | 7/1966 |
| DE | 10 2008 000735 | 6/2009 |
| DE | 10 2009 026 554 | 12/2010 |
| EP | 0 514 838 | 11/1992 |
| EP | 0 860 607 | 8/1998 |
| EP | 0 943 850 | 9/1999 |
| EP | 1 098 085 | 5/2001 |
| EP | 1 715 226 | 10/2006 |
| GB | 4659 | 0/1909 |
| GB | 27218 | 11/1912 |
| GB | 213573 | 6/1925 |
| GB | 599 211 | 3/1948 |
| GB | 1 026 855 | 4/1966 |
| GB | 1 181 228 | 2/1970 |
| GB | 1 241 022 | 7/1971 |
| GB | 1 354 486 | 5/1974 |
| GB | 1 456 601 | 11/1976 |
| GB | 1 504 281 | 3/1978 |
| GB | 2 169 990 | 7/1986 |
| GB | 2 442 597 | 4/2008 |
| GB | 2461989 | 1/2010 |
| JP | 51-88838 | 1/1950 |
| JP | 55-125926 | 2/1954 |
| JP | 56-171472 | 12/1981 |
| JP | 62-16868 | 1/1987 |
| JP | 10-122385 | 5/1998 |
| JP | 11-107504 | 4/1999 |
| JP | 11248012 | 9/1999 |
| JP | 2000-297864 | 10/2000 |
| JP | 2002 130492 | 5/2002 |
| JP | 2002-161676 | 6/2002 |
| JP | 2002 188734 | 7/2002 |
| JP | 2004-183731 | 7/2004 |
| JP | 2005 106286 | 4/2005 |
| JP | 2010 031979 | 2/2010 |
| WO | WO 99/57424 | 11/1999 |
| WO | WO 2004/090304 | 10/2004 |
| WO | WO 2006/100486 | 9/2006 |
| WO | WO 2007/145712 | 12/2007 |
| WO | WO 2009/070824 | 6/2009 |

OTHER PUBLICATIONS

International Search Report and Written Opinion from corresponding International application No. PCT/GB2008/004092, 13 sheets, mailed Apr. 23, 2009.

U.K. Search Report from U.K. patent application No. GB0813571.7, 3 sheets, dated Aug. 26, 2008.

U.K. Search Report from U.K. patent application No. GB0803795.4, 4 sheets, dated Aug. 26, 2008.

English Translation of Japanese Office Action, from related Japanese Application No. 2010-537511 dated May 21, 2013., JP.

Japanese Office Action, from related Japanese Application No. 2010-537511 dated May 21, 2013, JP.

Japanese Office Action in Japanese Application No. 2010-537512, including English translation, May 28, 2013, 21 pages.

* cited by examiner

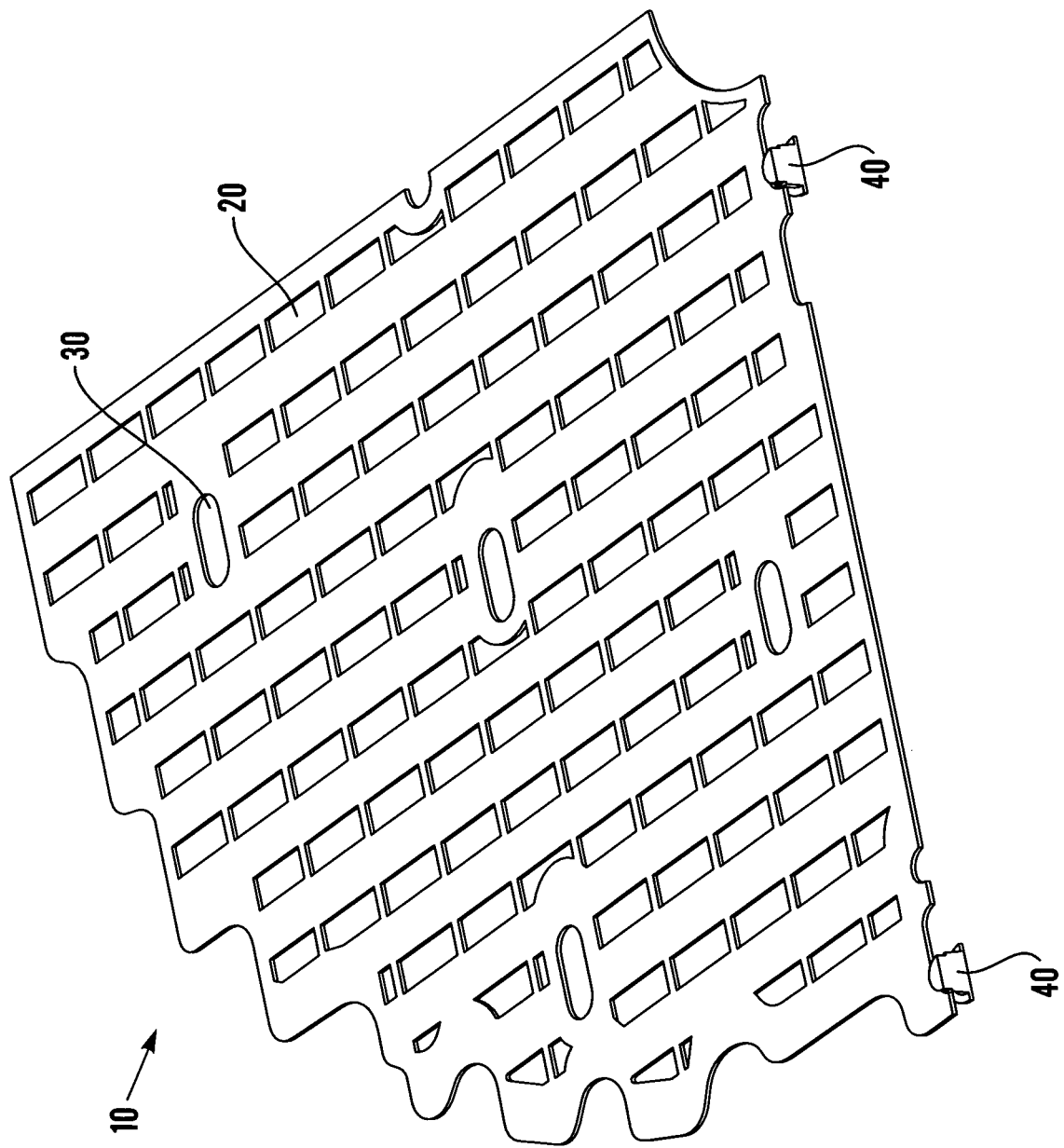

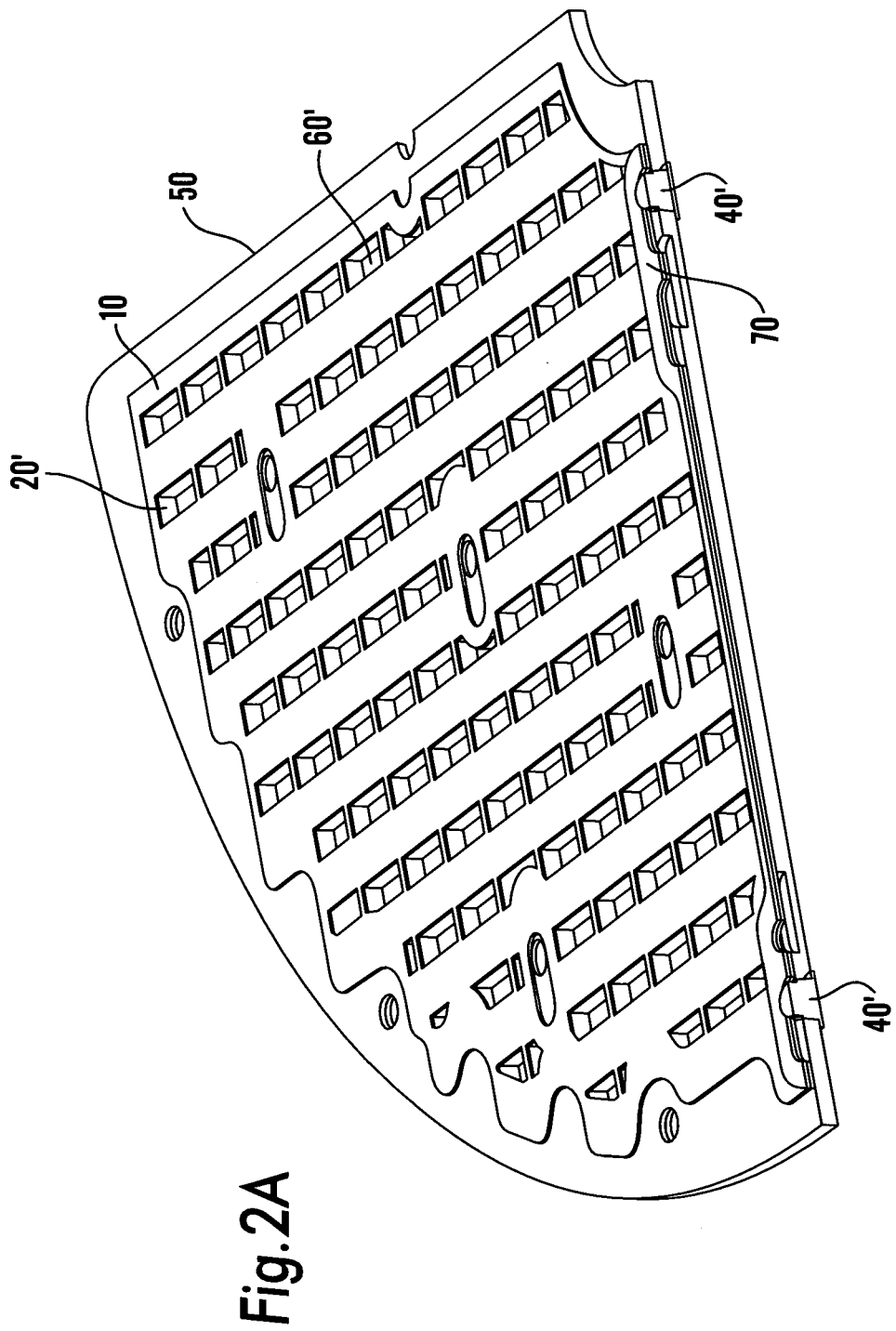

VALVE OPEN

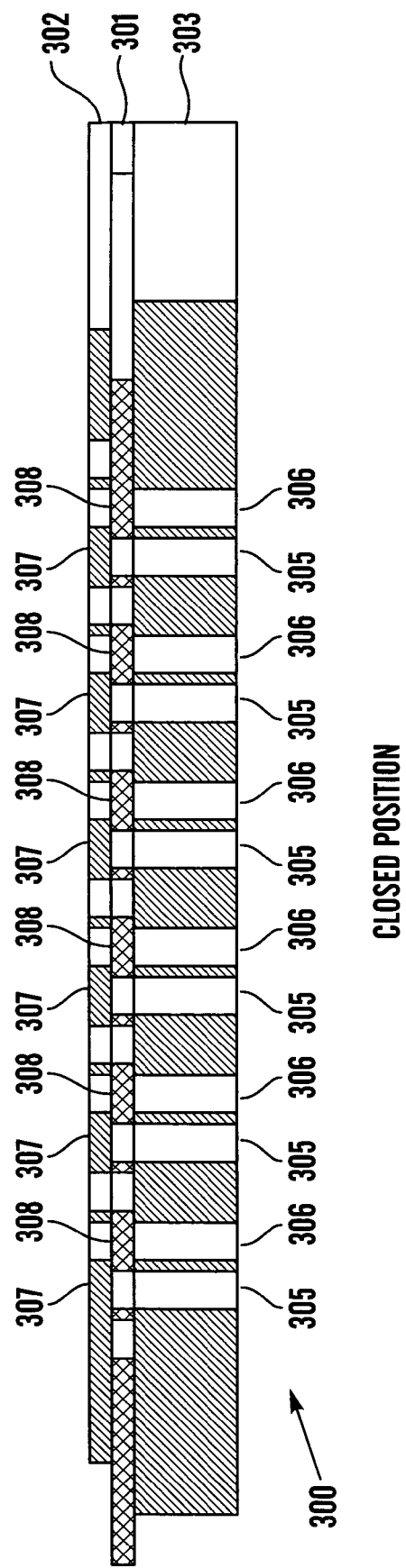

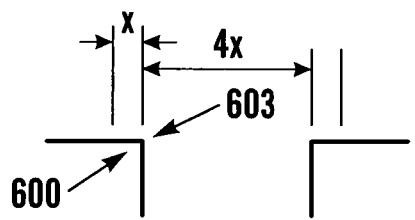
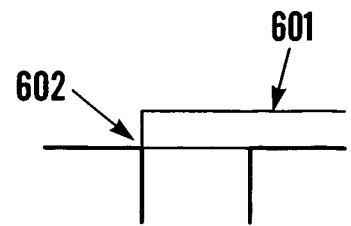
*Fig. 13A*      *Fig. 13B*
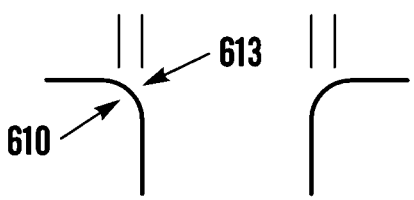
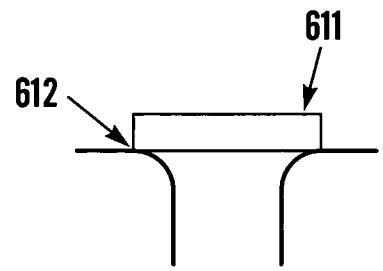
*Fig. 13C*      *Fig. 13D*
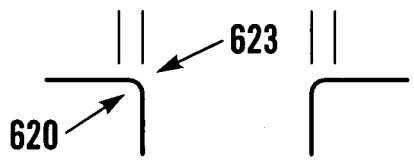
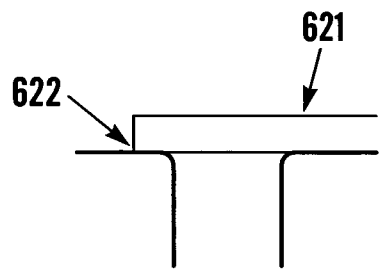
*Fig. 13E*      *Fig. 13F*
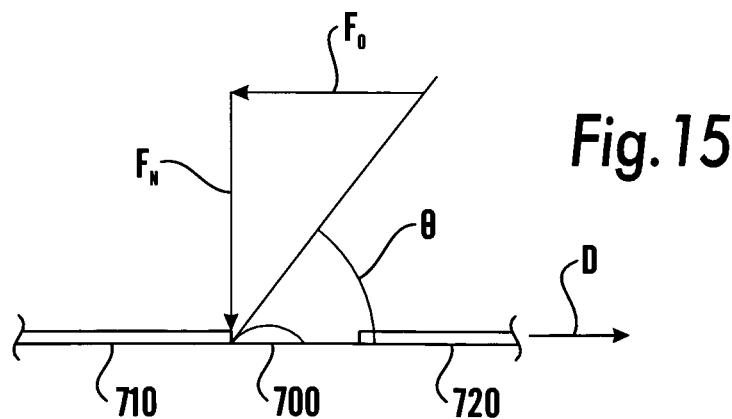
*Fig. 15*

VALVE

RELATED APPLICATION DATA

This U.S. national phase application is based on international application no. PCT/GB2008/004087, which was filed on Dec. 11, 2008, which claimed priority to British national patent application no. 0724158.1, which was filed on Dec. 11, 2007, British national patent application no. 0803795.4, which was filed on Feb. 29, 2008, British national patent application no. 0803794.7, which was filed on Feb. 29, 2008, and British national patent application no. 0813571.7, which was filed on Jul. 24, 2008. Priority benefit of these earlier filed applications is hereby claimed.

The present invention relates generally to valves for controlling flow of gases and/or liquids between two discrete spaces. In particular, the present invention relates to valves for use in applications in which the pressure in each of the discrete spaces can vary such that at some stage there is no pressure difference between the spaces and at other stages there is a pressure difference. One application of such valves is in the compression and/or expansion of gases. However, the valve of the present invention may be suitable for use in any application that needs a high efficiency, large valve area, fast valve response and low pressure losses. This covers, but is not limited to, engines, vacuum pumps, compressors, expanders, other pumps, ducts and pipeflow situations.

Current compression machinery valves are normally of the non-return type. This means that they can be reed valves, plate valves, ball valves, poppet valves or other similar devices. For example, in normal operation in a reciprocating air compressor comprising a piston configured to move in a cylinder space, the piston would move from top dead centre (TDC) towards bottom dead centre (BDC) leading to a drop in the pressure within the cylinder space. When the pressure has dropped sufficiently to overcome a spring holding one or more inlet valves closed, the one or more inlet valves would open and a charge of air is drawn into the cylinder space. As the piston approaches BDC the airflow will slow and the pressure difference will decrease allowing the one or more inlet valves to shut. The piston will now move back towards TDC compressing the fresh charge of air in the cylinder space. When the air pressure in the cylinder space is sufficiently high to overcome a spring holding one or more exhaust valves closed, the one or more exhaust valves will open allowing the charge of compressed air to pass into a pressurised space. As the piston approaches TDC this pressure difference and flow decrease allow the one or more exhaust valves to close.

In the case of the simple valve described above, there are a number of problems associated with the operation of the valve which limit its effectiveness. Firstly, there needs to be a force acting to close the valve and this means that there must be a certain amount of pressure difference applied to overcome this force and open the valve. This inevitably means there will be some pressure losses through the valve and that there must be a delay in opening the valve while the pressure difference increases. There is a further issue with this type of valve, which is that it can stop operating correctly if certain resonant frequencies are reached, possibly leading to the occurrence of valve flutter. A stiff valve and strong spring may be deployed to limit such undesirable behaviour, but the stronger the closing spring the greater the forces required to open the valve, which leads to unnecessary work and low efficiency.

If a machine is required to run at high speeds the valves must open and close more quickly than would be required at lower speeds leading to higher impact loads when the valves close. The normal solution is to limit the lift of the valve so that it has minimal distance to travel. While such an approach may reduce the impact loads experienced at high speed operation, it also undesirably reduces the effective valve area.

In general, expansion Valves are much more complicated than compression valves as they need to be held open against a flow that is normally moving in a direction that induces closure forces on the valve. This means that expansion valves must be actively controlled. This active control is normally carried out with a cam and poppet valve arrangement, in which the valve opens and closes at a preset point in each cycle regardless of the pressure difference between the two discrete spaces separated by the valve. This method of operation of expansion valves leads to significant losses as it is extremely difficult to configure such a valve to open at or near pressure equalisation (i.e. when the pressure difference across the valve is substantially zero).

The expansion valves described above normally require a strong supporting structure to allow the valves to open against a pressure differential. This means that such expansion valves are usually large and heavy components that must be rigid enough not to lock shut when there is a pressure difference between the two discrete spaces. Such valves are normally inefficient as they suffer significant pressure losses when they open without pressure equalisation.

Sealing can become an issue when a stiff valve is seated against a stiff valve face since any contamination by particles can lead to the valves not sealing and leakages occurring through the valves when closed. Obtaining good sealing between a valve and valve face can require precision grinding and/or running the valve in for a prolonged period.

The above prior art valves also normally include a guard to limit the lift of the valve and incorporate the closure spring. In the example of a piston compressor inlet valve, such a guard forms an integral space beyond the range of the piston stroke for fluid to pass into and this space is referred to as deadspace or clearance.

In addition to the problems discussed above, the conventional valve designs all suffer from significantly limited valve area. In a normal compression piston/cylinder arrangement where the inlet and outlet valves are both set within a head of the cylinder, a valve area of 5% or 6% of the piston area is not uncommon. This limited valve area has a second problem in that fluid flows through the valve area are often at very high rates if the compressor is running at a reasonable speed and the pressure losses through these valves may become significant. A doubling of valve area will lower the flow velocity through the valve by a factor of 2 and drop the pressure losses by a factor of approximately 4.

To increase the valve area it is common practice in compressor design to space multiple valves around the cylinder. This has the effect of increasing the valve area, but also has the effect of increasing the amount of deadspace or clearance as the piston rings must be kept below the level of the inlet/outlet ports.

The deadspace in the valves, their connection to the main cylinder and the space around the piston at TDC all combine to give a total clearance volume. Clearance is normally defined as a ratio of the clearance volume to the maximum volume (swept volume+clearance volume):

$$\text{Clearance} = \frac{\text{Clearance Volume } (\%)}{\text{Swept Volume} + \text{Clearance Volume}}$$

and for a piston compressor is normally in the 5%-15% range. The clearance has a very strong impact on volumetric efficiency, which is defined as:

$$\text{Volumetric Efficiency} = \frac{\text{Gas actually ingested per stroke (\%)}}{\text{Swept Volume}}$$

Neglecting Pressure Losses this approximates to:

$$\text{Volumetric Efficiency} = \frac{\text{Total Volume} - \text{Volume at Suction Valve Opening (\%)}}{\text{Swept Volume}}$$

Where

Total Volume = Swept Volume + Clearance Volume

For most normal piston compressors the volumetric efficiency is in the region of 70%-80%, but this will vary depending upon a number of factors, such as the pressure ratio of the compressor.

Accordingly, there is a desire to provide an improved valve which overcomes, or at least alleviates some of the problems associated with the prior art. In particular, there is a desire to provide an improved valve that offers fast opening and closing times, low inertia, high volumetric efficiency, low pressure losses, pressure activated opening and good sealing when compared to current valves.

In accordance with the present invention there is provided a valve comprising a first part defining a first aperture and a second part defining a second aperture, the first part being moveable relative to the second part between a closed configuration in which passage of a fluid through the valve is substantially prevented and an open configuration in which passage of fluid is allowed.

The first and second parts may configured to lock in the closed configuration in response to a pressure differential across the valve. In addition, the first part may be configured to be sealed against the second part by a pressure differential across the valve when the first and second parts are locked in the closed configuration. In this way, a valve may be provided in which a pressure differential across the valve provides the sealing force and which remains locked in a sealed configuration whilst any significant pressure differential exists across the valve. The valve will automatically release from the locked, sealed configuration when the pressure differential across the valve drops to substantially zero. Wear is kept to a minimum as the valve only moves when it is unloaded or lightly loaded and there is no or very little pressure difference between the two spaces. This means the valve may be unlubricated if required.

In one embodiment the first part may comprise a flexible plate-like member configured to engage a sealing face of the second part when in the closed configuration and lock in the closed configuration in response to a pressure differential across the valve. The plate-like member may be sufficiently flexible to conform to a profile of the sealing face in response to a pressure differential across the valve in order to seal the valve. In this way, a valve is provided in which a lightweight valve member may be locked in place by even a small pressure difference and may be used to provide fast valve movements for a small energy input. The conformability of the flexible plate-like member may further allow the plate-like member to provide a good seal against the sealing face of the second part even when there is some contamination between the first and second parts.

The first part may be moveable laterally relative to the second part (e.g. in the plane of the second part) such that in the closed configuration the first and second apertures are not registered and in the open configuration the first and second apertures are registered. In this way the first part is held out of the flow path of the gas when the first and second parts are in the open configuration and thus any tendency to flutter is avoided and the air has an unrestricted path through the valve. The first part may be configured to move parallel to the surface of the sealing face. The surface of the sealing face may be a plane, a single curvature surface (e.g. cylindrical surface), or a surface of rotation.

The first part may be configured to move linearly relative to the second part (i.e. to form a linear slide valve) or may be configured to rotate relative to the second part (i.e. to form a rotary slide valve). The first part may be supported by the sealing face of the second part during movement between the open and closed configurations. Advantageously, the sliding motion of the first part relative to the second part will tend to act as a self-cleaning mechanism.

In one embodiment, the first part may be constrained to move substantially parallel to the surface of the sealing face of the second part. For example, in the case of a first part comprising a flexible plate-like member, the flexible plate-like member may be constrained to move in the plane of the member (i.e. its stiffest axis). The flexible plate-like member may be constrained to move along the surface of the sealing face by a retaining plate.

The retaining plate may comprise a foraminous screen configured to substantially cover the flexible plate-like member. In addition to constraining movement, the retaining plate may additionally serve to protect the flexible plate-like member. The retaining plate may be configured allow the flexible plate-like member to move freely along the plane of the member whilst substantially resisting movement normal to the plane of the member. In this way, the retaining plate may reduce buckling or rippling of the flexible plate-like member. The retaining plate may comprise a substantially planar body. In this way, the retaining plate may be configured to provide minimal deadspace when positioned in a compression or expansion chamber. In one embodiment, the retaining plate may comprise a relatively thin material (for example laser cut, water cut or photo etched) that is shaped to provide minimum deadspace while not impacting on the flow through the valve. For example, the retaining plate may comprise one of a series of wires in tension, a series of studs with caps, a thin cut metal sheet or metallic webbing.

Since the retaining plate does not need to be moveable, the retaining plate may be constructed using material selected for their strength or thermal properties regardless of weight. For example, the retaining plate may comprise stainless steel with a thermally beneficial coating (e.g. thermally insulating coating).

It is preferable that the retaining plate does not obstruct the fluid flow through the first and second apertures and, where near-isentropic behaviour is important that it creates minimal additional turbulence. If a suitable material or surface coating is selected then the retaining plate may have low emissivity and/or low thermal conductivity, which may also contribute to improved near-isentropic behaviour. The retaining plate may also protect the valve plate from debris that might otherwise strike the first part.

The first and second parts may be configured to lock in the closed configuration in the presence of a pressure differential across the valve by means of limiting friction between the first and second parts. For example, the friction between the flexible plate-like member when conformed to the profile of the sealing face of the second part and the sealing face may be sufficient to substantially prevent lateral movement of the flexible plate-like member relative to the sealing face. In situations where it is not possible to rely on limiting friction, locking means may still be provided by the pressure differential to maintain the first and second parts in the closed configuration. The locking means may comprise a positive pressure actuated locking mechanism (e.g. a latch mechanism) or a static pressure actuated geometric constraint (e.g. retraining protuberance or stud) for providing additional resistance against lateral movement between the first and second parts.

The valve may comprise opening means for moving the first part from the closed configuration to the open position and closing means for moving the first part from the open position to the closed configuration. The opening means and closing means may be two discrete mechanisms or may comprise a single mechanism (e.g. single pneumatic actuator).

In one embodiment the opening means may comprise opening biasing means configured to apply a biasing action when the first part is in the closed configuration and the valve further comprises trigger means for selectively engaging the closing means when the first part is in the open configuration. In this way, the opening device will act to apply a biasing force to the valve while pressure is still locking the valve in place, whereby the valve will open at or near pressure equalisation as the biasing force overcomes the locking force (e.g. frictional force) produced by the pressure differential.

The closing means may comprise closure force producer means configured to overcome the opening biasing means. Operation of the trigger means may be independent of the pressure across the valve. In one embodiment, the closure force producer means comprises a pre-loaded force producer, such that the closure event is fast relative to the time taken to pre-load the force producer. In another embodiment, one of the first and second parts may comprise locating slots to receive one or more closure pins to locate and additionally reset the closing means. Similarly, one of the first part and the second part may comprise one or more locating holes to allow one or more opening pins to locate.

The closure location may be controlled by one or more accurately located pins in combination with the closure force producer, with the flexible plate-like member being held in tension therebetween. In another embodiment, the lateral position of the first part relative to the second part when in the opening configuration may be controlled by one or more accurate location pins in combination with the opening biasing means, with the plate being held in tension therebetween.

The valve may further comprising reset means for selectively disengaging the closing means when the first part is locked in the closed configuration by the pressure differential. The closure of the valve may be actuated mechanically at selectable varying points in the cycle.

The opening means may comprise opening housing means, opening pin means and opening spring means. The closing means may comprise closing housing means, closing pin means, trigger means and closing spring means. The closing spring means may be stronger than the opening spring means. In the case that the opening means and closing means are provided by a single mechanism, the opening pin means and the closing pin means may comprise a single pin.

The first part may be configured to move from the open configuration to the closed configuration when the trigger means is activated and the closing spring means moves (via the closing pin means) the first part to the closed configuration. As the first part moves towards the closed configuration, the opening pin means and opening spring means may be configured to move at the same time since the closing spring means is stronger than the opening spring means.

The closing means may be configured to be mechanically reset and the trigger means locked into place before the opening means is engaged. The opening means may be configured to bias the first part in the open configuration via the opening spring means and the opening pin means. In this way, when the pressure either side of the valve plate is equal or near equal the first part will move automatically from the closed configuration to the open configuration.

The first part may comprise a strengthening member for providing localised stiffness. In the case of a flexible plate-like member, the strengthening member may help to avoid large stresses in the flexible plate material whilst maintaining the ability of the flexible plate-like member to conform to the profile of the sealing face and without significantly increasing the weight of the first part. The strengthening may comprise an elongate part extending from substantially one lateral side of the first part to a second lateral side of the first part, opposed to the first part or as required by the stress field in the first part. The stiffening member may be a separate member or it may be an integral part of the same structure.

At least one of the opening means and the closing means may engage the strengthening member when moving the first part relative to the second part. The opening means and/or closing means may engage the strengthening member at a location on or ahead of the centre of gravity of the first part. This configuration is particular advantageous in the case of a flexible plate-like member. If the flexible plate-like member is pushed from a point located behind the centre of gravity, then precise guides may be necessary to keep the flexible plate-like member in line.

In one embodiment, the first and second parts comprise interengageable parts for controlling relative movement (e.g. oscillating movement) between the first and second parts. In one embodiment the interengageable parts comprise a guide pin and a corresponding slot for receiving the guide pin. In this way, relative movement between the first and second parts may be restricted to move in path defined by the slot thereby controlling both the direction and distance of relative movement between the first and second parts.

In one embodiment movement of the first part relative to the second part is constrained by two or more accurately located and sized location pins such that the first part can only move backwards and forwards relative to the second part in a single straight line or single arc and movement in any other direction is minimised. Advantageously, the use of such an arrangement allows the movement between the first and second parts to be accurately controlled without having to provide a precise actuating mechanism. In one embodiment, one of the first and second parts may further comprise a stop pin for abutting a guide pin on the other part when the first and second parts have attained the open or closed configuration. In one embodiment the stop pin and the location pin serve the same function by providing both accurate guidance and an accurate stop position.

In one embodiment, the first part comprises a first array of apertures and the second part comprise a second array of apertures. The first part is moveable laterally relative to the second part such that in the first configuration the first and second arrays of apertures are not registered and in the second configuration the first and second arrays of apertures are registered.

Each aperture of the first and second array of apertures may have a relatively small cross-sectional area compared with the area of the first and second parts respectively. In this way, only a small relative movement between the first and second parts is necessary to move the parts between the open and closed configurations. Furthermore, the use of arrays of relatively small apertures allows first and second parts having non-uniform shapes to be produced without the loss of valve area. This also means that parts of the valve can be interrupted by other structure (such as supporting struts) with minimal impact on valve area. Lightweight structures can also be fitted within reciprocating pieces, such as the piston head.

In the case of a first part comprising a flexible plate-like member, the aperture size may be configured such that the flexible plate-like member can bridge corresponding apertures in the second part without significant sagging. Furthermore, the aperture size may be configured to ensure that the flexible plate-like member does not catch a lip of the corresponding apertures in the second part as the first part moves into the closed configuration.

In one embodiment, the total open aperture area (i.e. the total open aperture area when the first and second parts are in the open configuration) is over 20% of the total valve area. In another embodiment, the total open aperture area is over 30% of the total valve area. In yet another embodiment, the total open aperture area is over 40% of the total valve area. In yet another embodiment, the total open aperture area is over 50% of the total valve area.

In one embodiment, the aperture density (i.e. the number of apertures per unit area of valve surface) is greater than 1000 per $m^2$. In another embodiment, the aperture density is greater than 2000 per $m^2$. In another embodiment, the aperture density is greater than 4000 per $m^2$. In yet another embodiment, the aperture density is greater than 8000 per $m^2$. In yet a further embodiment, the aperture density is greater than 12000 per $m^2$. In a yet a further embodiment, the aperture density is greater than 16000 per $m^2$.

In one embodiment, the average aperture area is less than 1% of the total valve area. In another embodiment, the average aperture area is less than 2% of the total valve area. In a further embodiment, the average aperture area is less than 3% of the total valve area. In yet a further embodiment, the average aperture area is less than 4% of the total valve area. In a yet further embodiment, the average aperture area is less than 5% of the total valve area.

In one embodiment, the sealing area around the apertures is less than 40% of the total valve area. In another embodiment, the sealing area around the apertures is less than 30% of the total valve area. In a further embodiment, the sealing area around the apertures is less than 20% of the total valve area. In yet a further embodiment, the sealing area around the apertures is less than 10% of the total valve area.

In one embodiment the valve has a mass of less than 20 kg per $m^2$. In another embodiment, the valve has a mass of less than 15 kg per $m^2$. In yet another embodiment, the valve has a mass of less than 10 kg per $m^2$. In yet a further embodiment, the valve has a mass of less than 5 kg per $m^2$. In a yet further embodiment, the valve has a mass of less than 2 kg per $m^2$.

The first and second array of apertures may be evenly (e.g. homogenously) distributed across the first and second parts. Advantageously, such a homogenous distribution of apertures has been identified to reduce unwanted turbulence when near-isentropic compression or expansion processes are required.

The first part may comprise of one or more valve plates, which can be configured in one layer or in multiple layers.

In one embodiment the first part comprises a pair of moveable plates (e.g. linearly moveable or rotatably moveable), each plate of the pair comprising a sub-set of the first array of apertures. The pair of moveable plates may be configured to move in opposite directions to one another as the first part moves between the first and second configurations. In one embodiment, each plate of the pair is configured to seal a different group of apertures in the second array of apertures. In another embodiment, each plate of the pair is configured to seal a different section of the same group of apertures in the second array of apertures. In this way, the valve may be configured to either reduce the closure time or increase the valve area beyond that achievable with one or more valve plates sliding in a single layer.

In the case that the first part is configured to move linearly relative to the second part, the first part may in one embodiment comprise two further pairs of moveable plates, each pair being associated with a different axis (e.g. different coplanar axis), with each pair of moveable plates being configured to move in opposite directions along its respective axis. In another embodiment, the first part may comprise three further pairs of moveable plates, each pair being associated with a different axis (e.g. different coplanar axis), with each pair of moveable plates being configured to move in opposite directions along its respective axis. Each axis associated with a pair of moveable plates may be equally spaced from an adjacent axis.

In one embodiment, the profile of the sealing face of the second part is configured permit smooth movement of the first part relative thereto. For example, the or each aperture in the sealing face may comprise a peripheral edge region having a radius configured to ensure good sealing whilst enabling the first part to slide thereover. In this way, the risk of the first part 'picking' the edge as it slides over the second part may be reduced. Such picking may be a particular problem where the first part comprises the flexible plate-like member since the plate may be flexible enough to sag slightly as it crosses the open aperture. For example with an aperture size of 4 mm by 4 mm, a 0.5 mm mylar valve and a sealing edge of 1 mm around the aperture, a radius of between 0.05 mm and 0.1 mm could be used on the aperture in the second part.

The valve material does not need to be particularly strong as it is supported by the sealing face, this means it can be lighter, have lower inertia and hence, can move faster for less energy. The valve sealing area may not be particularly large in relation to the valve area. The smaller the sealing area the higher the precision that is required to control the valve plate position in order to avoid leakage. Generally with one valve plate a theoretical maximum of just under 50% of the total area can be achieved and with two plates this figure can be increased to just under 66.7%. Other useful linear combinations are made up from 6 and 8 valve plates with theoretical maximums of just under 86% and 89% respectively. One further advantage of multiple valve plates with large total aperture areas is that each plate can be very light and can therefore be faster acting.

The valve material can be made from a variety of materials, some examples are plastics (e.g. Mylar, Peek), composites (e.g. Carbon, Glass, Aramid Epoxy), metals (e.g. stainless steel) and ceramics (e.g. thin silicon Carbide Carbon sheets). The temperatures and pressures involved will have a significant impact on the actual material selected to ensure that it does not adversely deform under use. In certain applications it can be useful to use materials that suffer from creep and plastic deformation as they have other beneficial properties. In these case the creep and plastic deformation can be overcome by bonding a stronger material to provide localised strength, such as stainless steel on Mylar. The valve material (including the flexible plate-like member) may be laser cut, water cut, photo etched, cut or formed by other means.

Embodiments of the present invention will now be described by way of example with reference to the accompanying drawings in which:

FIG. 1b is a schematic illustration of a section "A" of a valve plate means of the piston of FIG. 1a;

FIGS. 2a and 2b are schematic illustrations of a valve plate means in combination with sealing face plate means with the valve plate means in the open and closed positions respectively;

FIGS. 4a and 4b are schematic illustrations of an opening means of the piston of FIG. 1a;

FIGS. 5a and 5b are schematic illustrations of a closing means of the piston of FIG. 1a;

FIG. 11 is a schematic cross-sectional view of the valve of FIG. 8 in the closed position;

Figure 14:
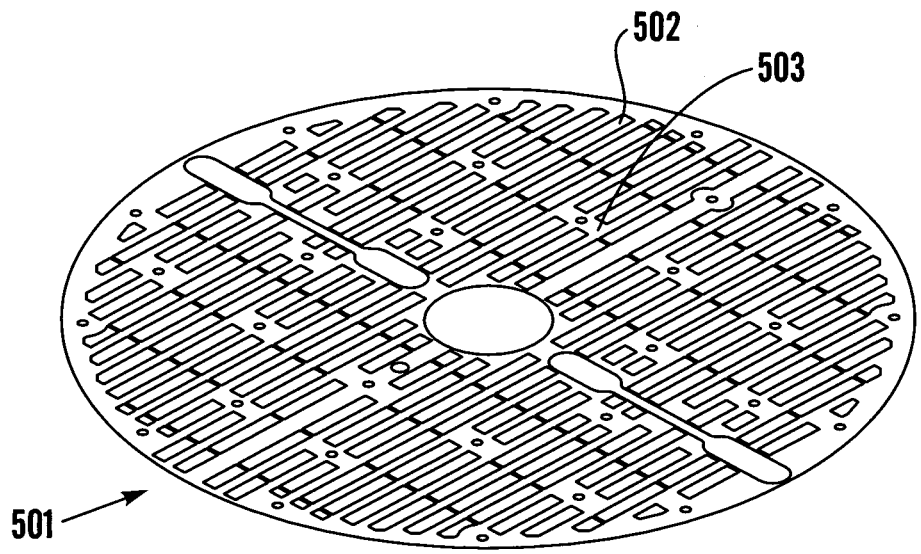
Figure 16:
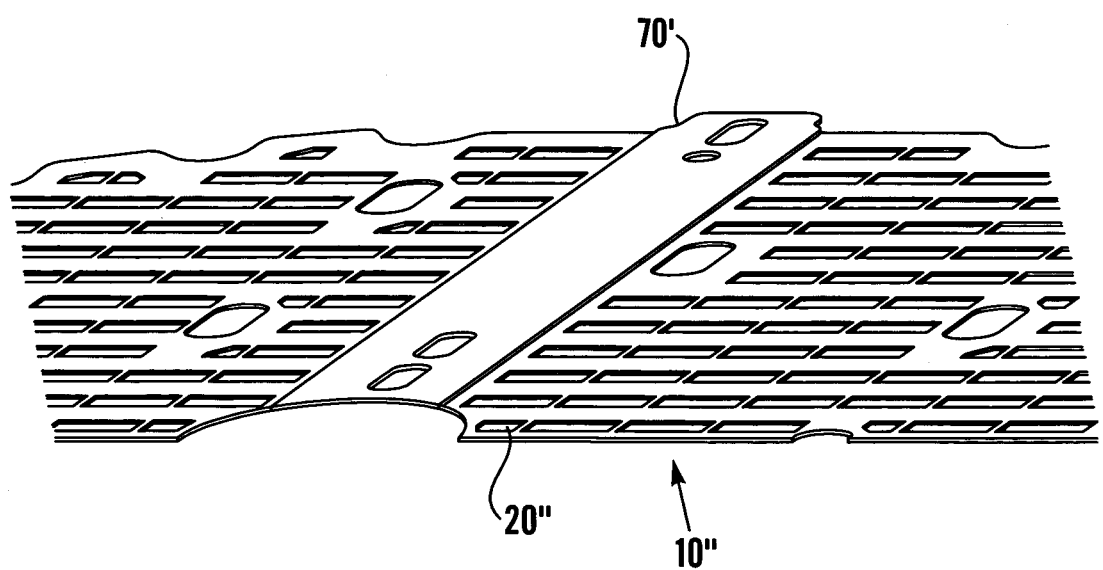

FIGS. 13a, 13b, 13c, 13d, 13e and 13f show schematic cross-sectional views of passageway configurations in accordance with embodiments of the invention where 13e and 13f show the preferred implementation; and FIG. 14 is a schematic view of a first retaining plate;

FIG. 15 shows a geometric restraint in the form of a restraining stud that can be used when limiting friction is not sufficient to lock the valve plate in place under the force of a pressure differential; and FIG. 16 is a schematic detailed view of a valve plate means with integral stiffening member.

DETAILED DESCRIPTION OF FIGURES

Figure 1A:
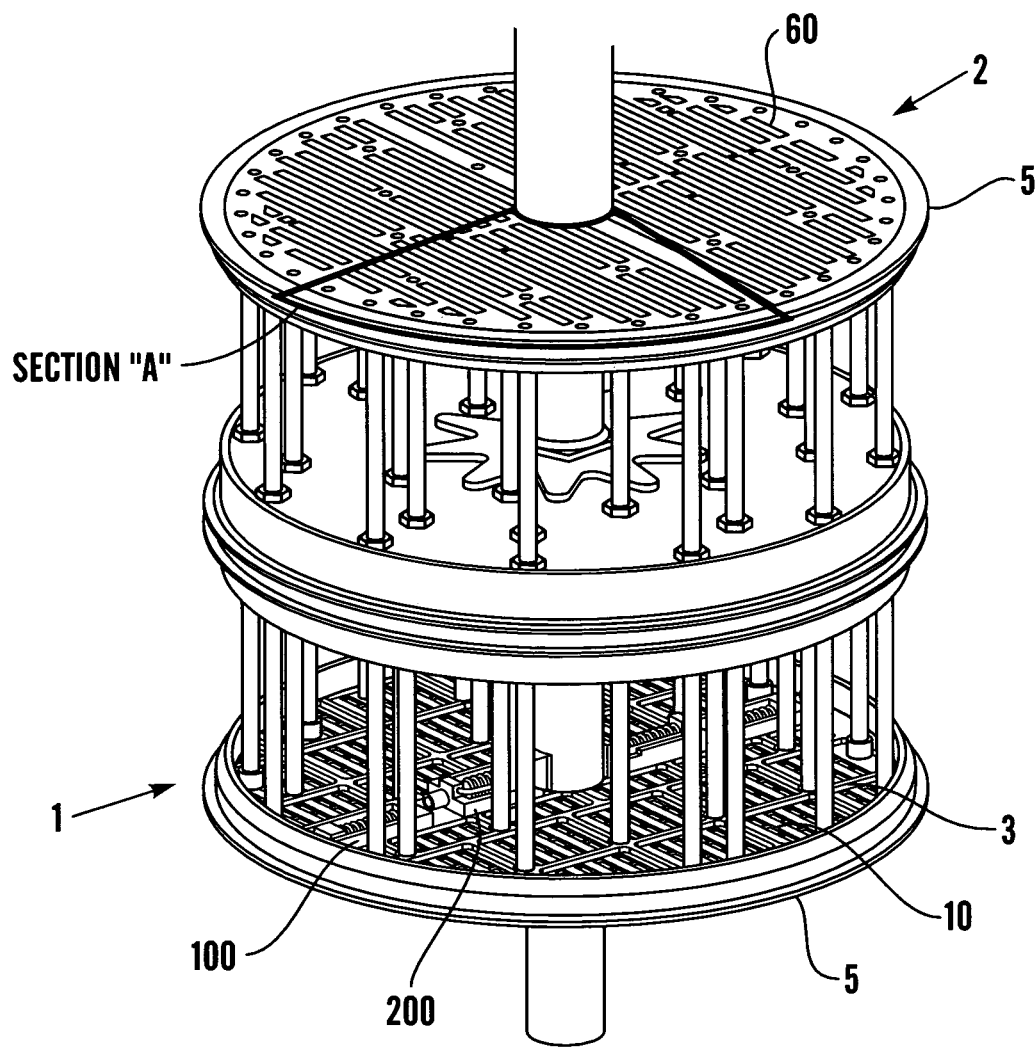
FIG. 1a shows a schematic illustration of a double acting piston comprising a valve according to a first embodiment of the present invention.

FIGS. 1a and 1b

FIG. 1a shows a schematic illustration of a double acting piston 1 comprising a valve 5 including: piston face means 2 including multiple sealing ports 60; retaining plate means 3; valve plate means 10; opening means 100; and closing means 200.

As shown in FIG. 1b, valve plate means 10 comprises: multiple valve plate ports 20; multiple attachment point means 30; and locating pins means 40. In use, valve plate means 10 is moveable relative to piston face means 2 between a closed position for substantially preventing fluid flow through the valve 5 and an open position for allowing passage of fluid through the valve.

In the closed position, sealing ports 60 and valve plate ports 20 are wholly unregistered and the valve plate means 10 is sealed against the piston face means 2. In the open position, sealing ports 60 and valve plate ports 20 are registered to form a multiple passageways through the valve.

FIG. 2a

FIG. 2a shows valve plate means 10' according to a second embodiment of the invention in combination with sealing face means 50. Valve plate means 10' comprises strengthening strip means 70 and multiple valve plate ports 20'; sealing face plate means 50 comprises multiple sealing face ports 60'; and locating pins means 40'. As shown in FIG. 2a, the valve plate means 10' is in the open position with the valve plate ports 20' wholly aligned with the sealing face ports 60' on the sealing face means 50.

FIG. 2b

Figure 2B:
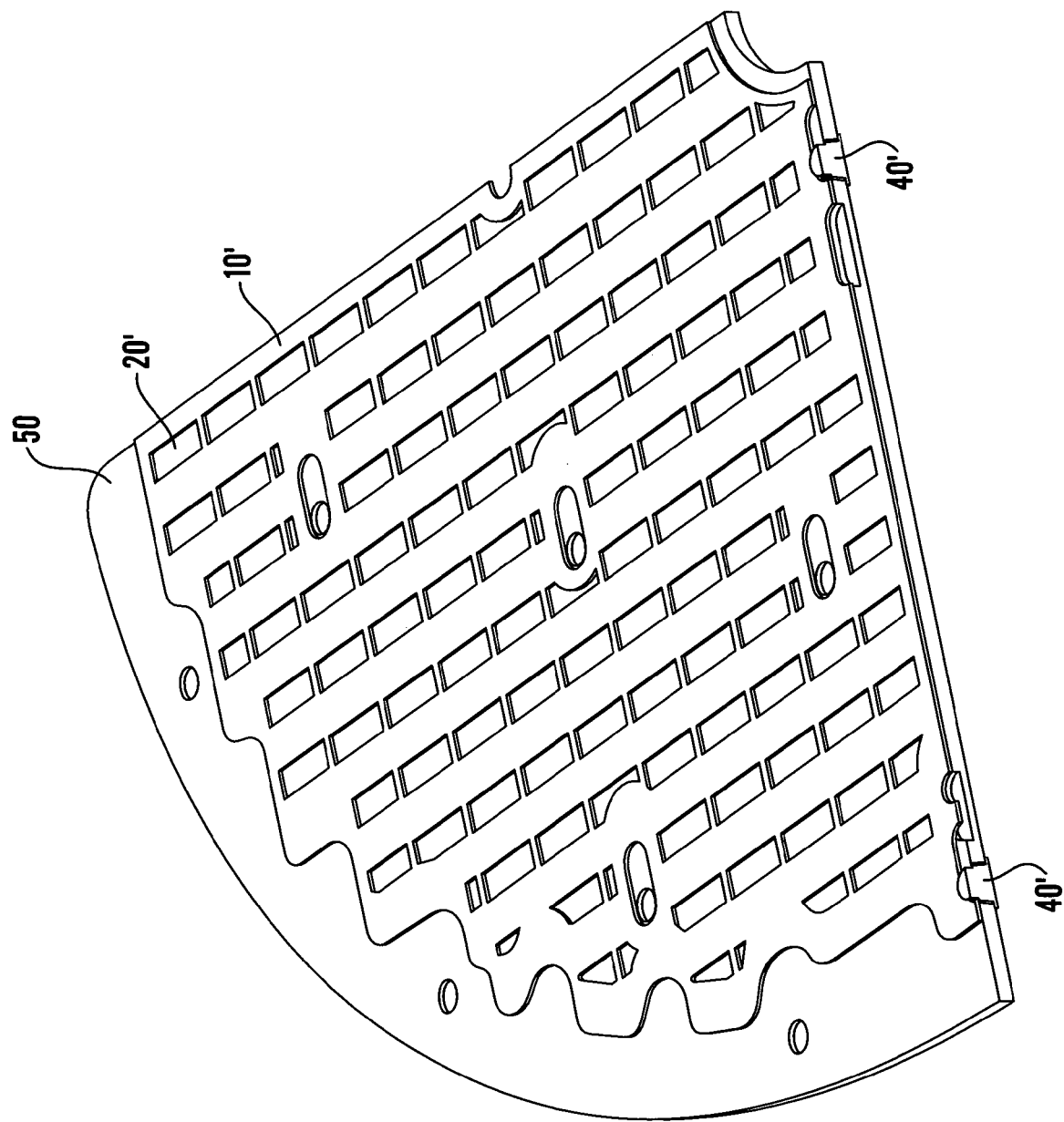

FIG. 2b shows valve plate means 10' in the closed position with the valve plate ports 20' wholly offset with the sealing face ports 60' on the sealing face means 50.

FIG. 3

Figure 3:
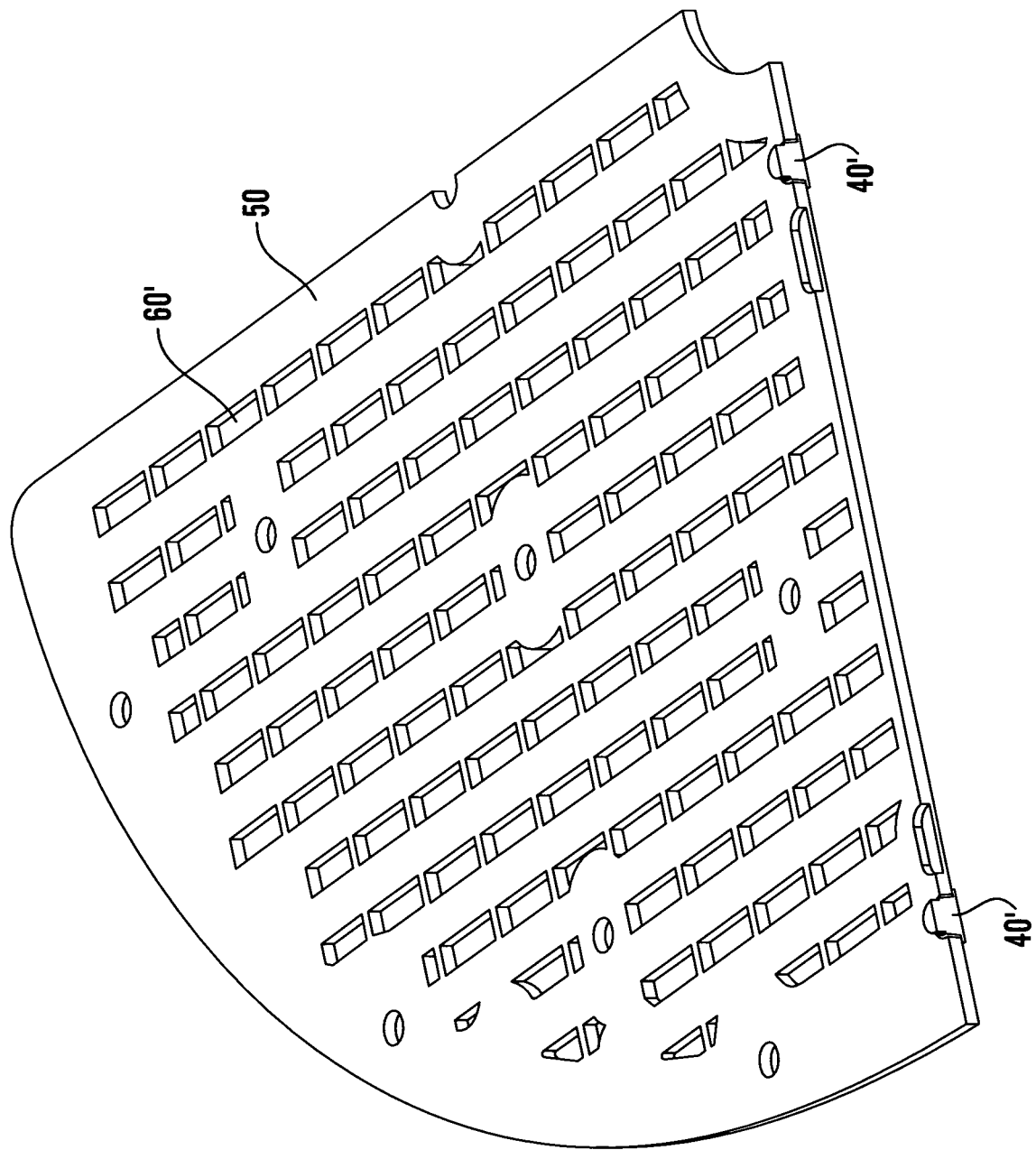
FIG. 3 is a schematic illustration of the sealing face means of FIGS. 2a and 2b without the valve plate means.

FIG. 3 shows sealing face means 50 comprising multiple sealing face ports 60' and location pins 40'.

Figure 4A:
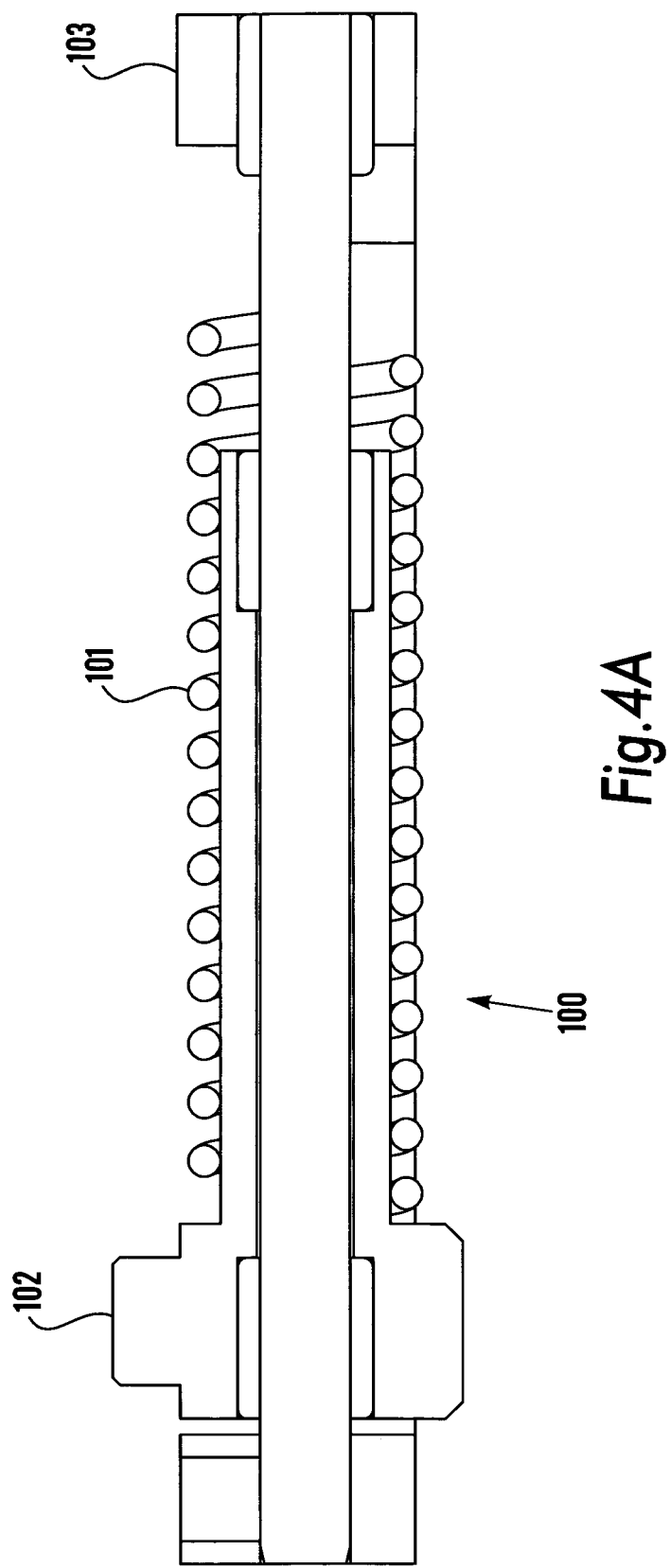
Figure 4B:
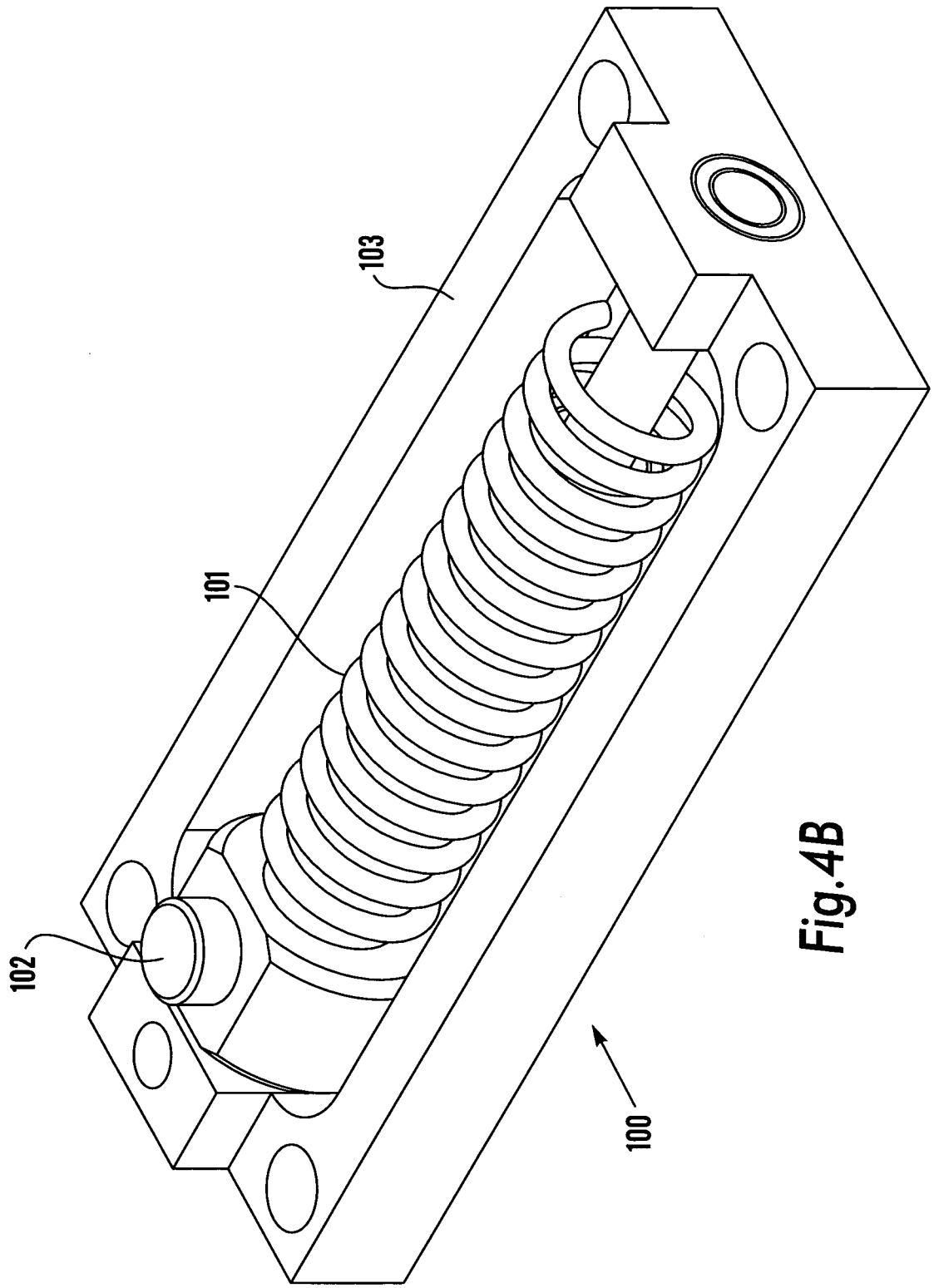

FIGS. 4a and 4b

FIGS. 4a and 4b shows opening means 100 comprising opening spring means 101, opening pin means 102 and opening housing means 103.

When the opening spring pin means 102 is moved in the direction that compresses the opening spring means 101 the opening spring means 101 provides a biasing force that can be used to move valve plate means 10 via the opening pin means 102 from the closed position to the open position when the pressure differential across the valve 5 is at or near pressure equalisation.

Figure 5A:
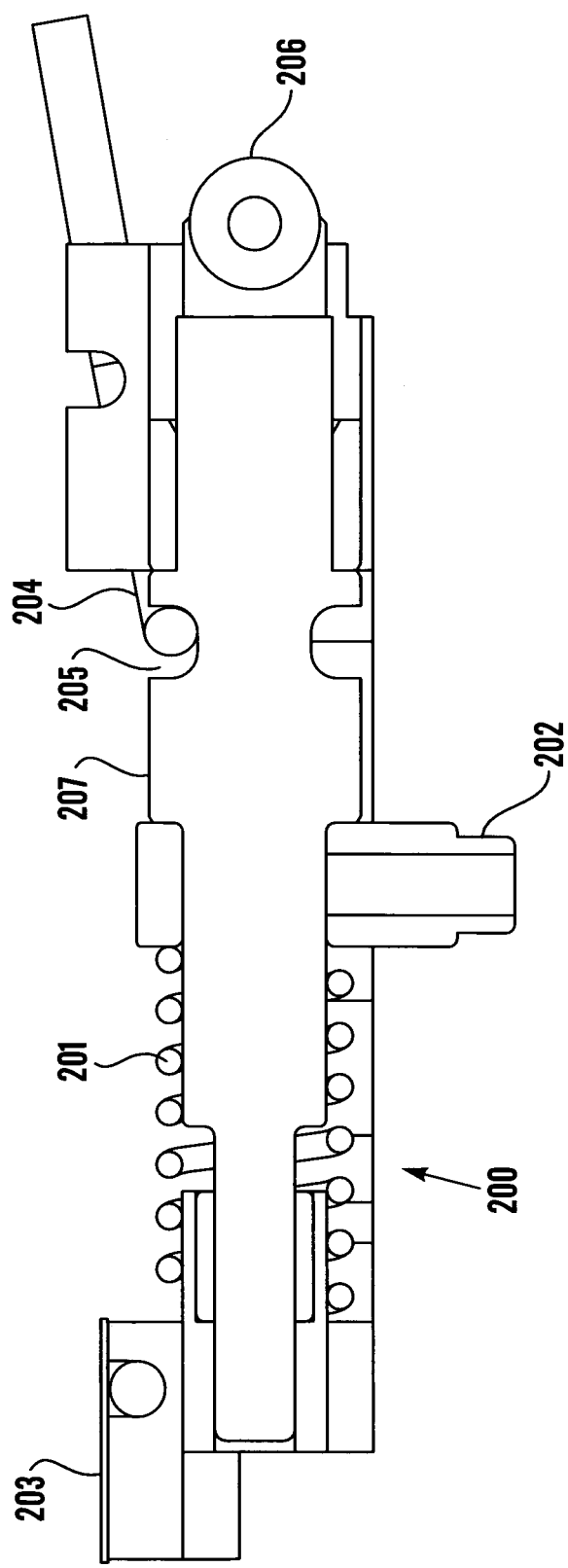
Figure 5B:
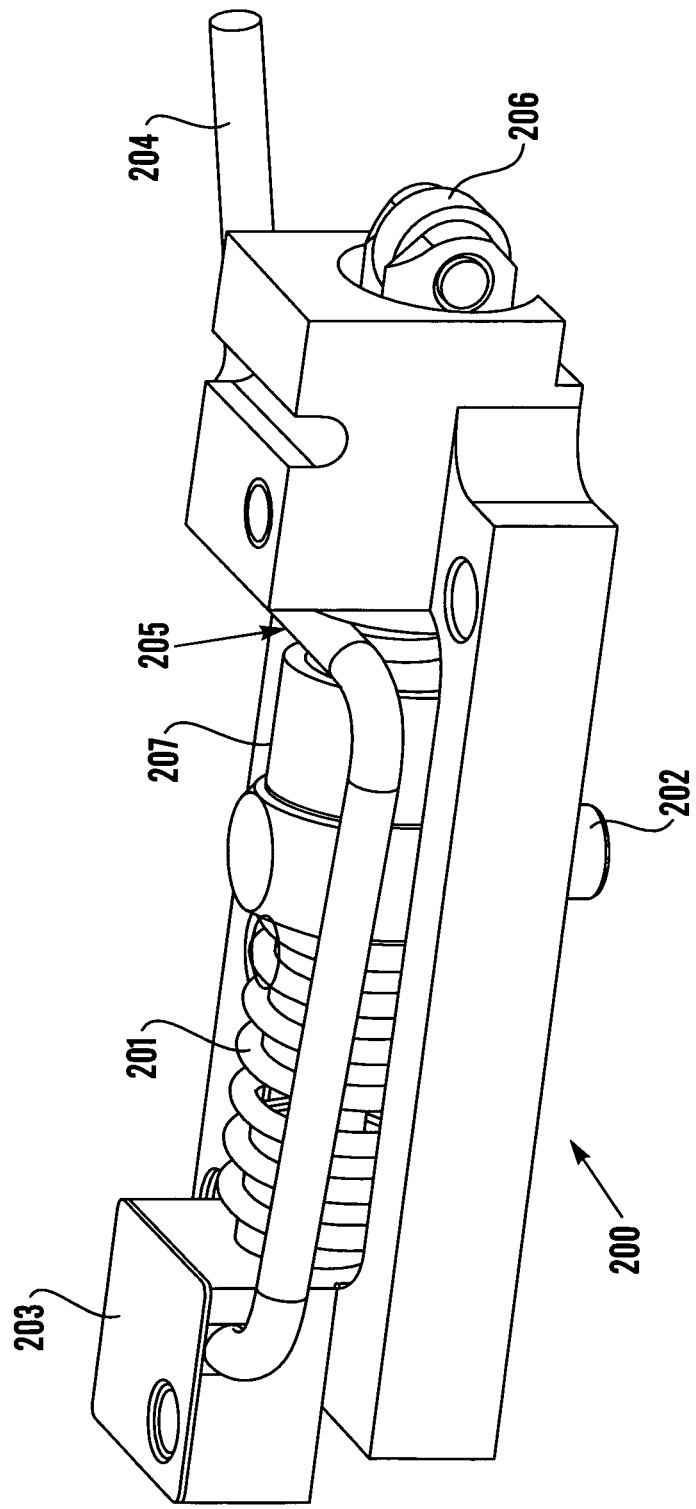
Figure 6:
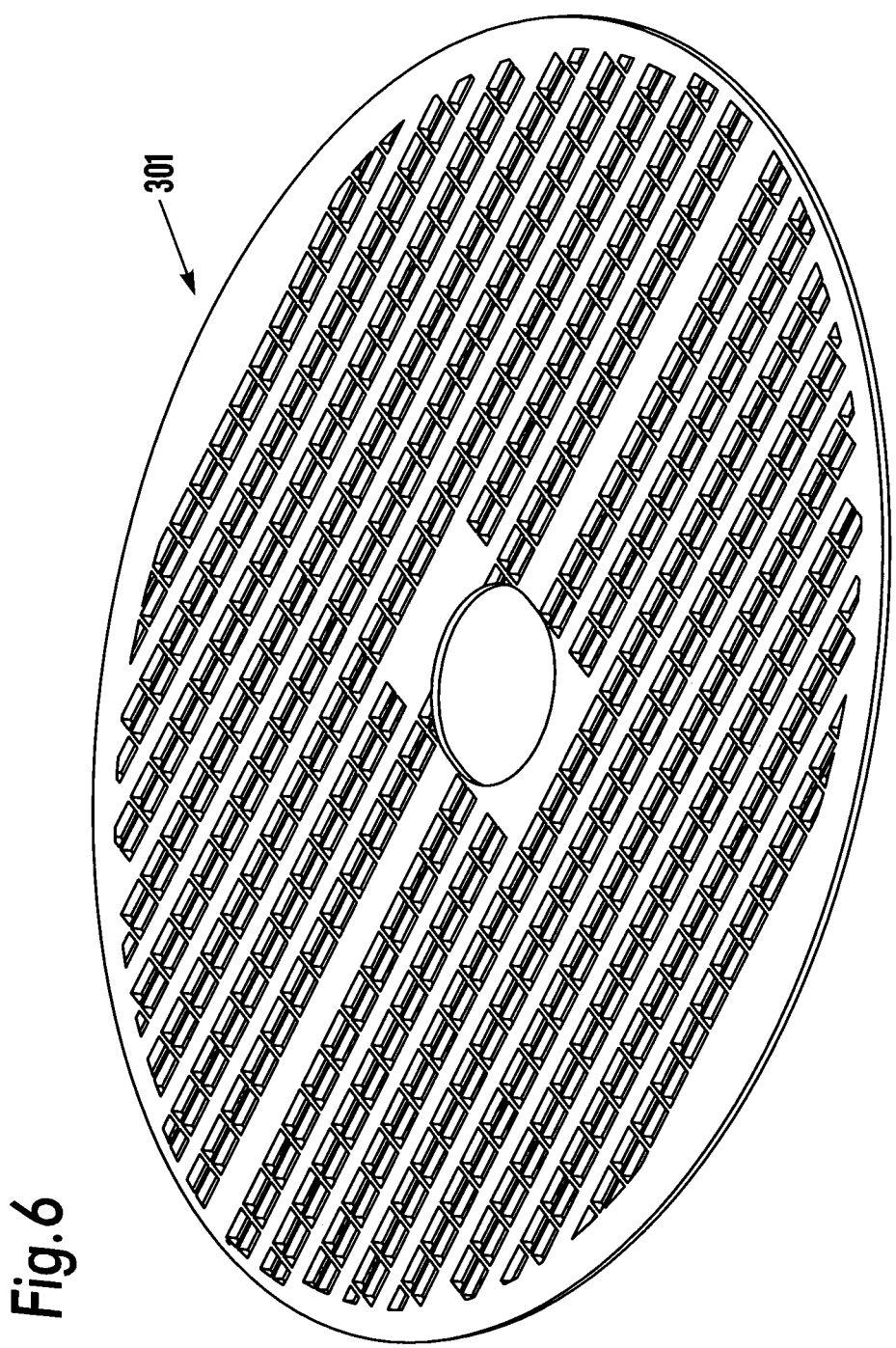
FIG. 6 is a schematic view of valve plate means of a valve in accordance with another embodiment of the present invention.
Figure 7:
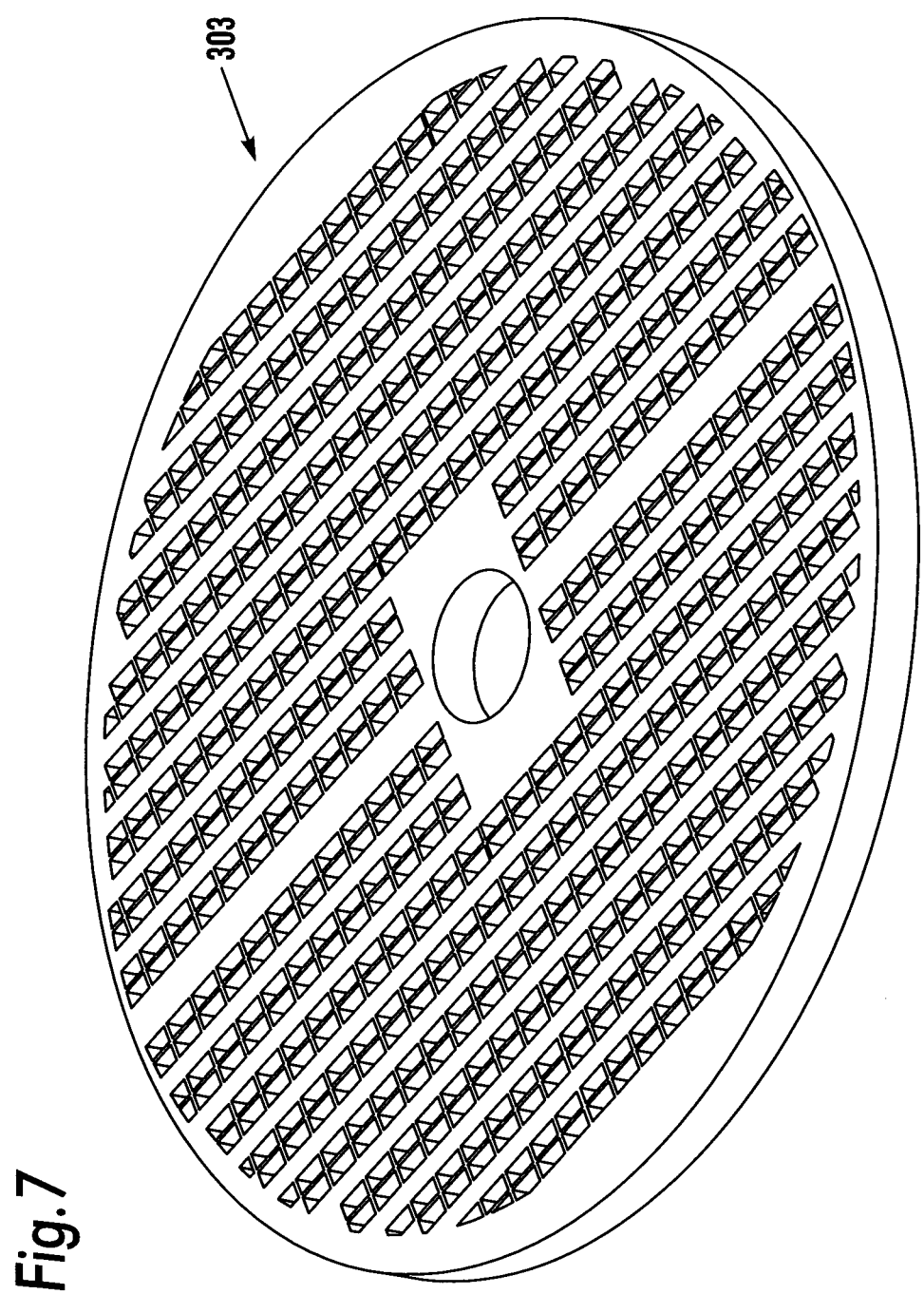
FIG. 7 is a schematic view of sealing face plate means for use with the valve plate means of FIG. 6.

FIGS. 5a and 5b

FIGS. 5a and 5b shows a closing means 200 comprising closing spring means 201, closing housing means 203, trigger means 204 and closing shaft means 207 comprising closing pin means 202, trigger slot means 205 and reset roller 206.

When the reset roller means 206 runs along a reset cam means (not shown) it pushes the closing shaft means 207 into the closure housing means 203 such that the closure spring means 201 is compressed and the trigger means 204 drops into the trigger slot means 205. The reset roller means 206 moves past the reset cam means (not shown) and the closure spring means 201 pushes the closing shaft means 207 via the trigger slot means 205 against the trigger means 204. In this position opening means 100 can move valve plate means 10 from the closed position to the open position at or near pressure equalisation.

When the trigger means 204 contacts a trigger stop means (not shown) it lifts the trigger means 204 out of the trigger slot means 205 and the closing spring means 201 moves the closing pin means 202 via the closing shaft means 207 such that valve plate means 10 coupled to the closing pin means 202 will move from the open position to the closed position.

The closing spring means 201 is stronger than the opening spring means 101 such that the movement of the valve plate means 10 may also 'reload' the opening spring means 101 by compressing it.

FIGS. 6 to 10

FIGS. 6 to 10 show valve means 300 according to another embodiment of the invention, valve means 300 comprising first valve plate means 302, second valve plate means 301, and valve sealing face means 303. In use, second valve plate means 301 is located between first valve plate means 302 and valve sealing face means 303.

Figure 8:
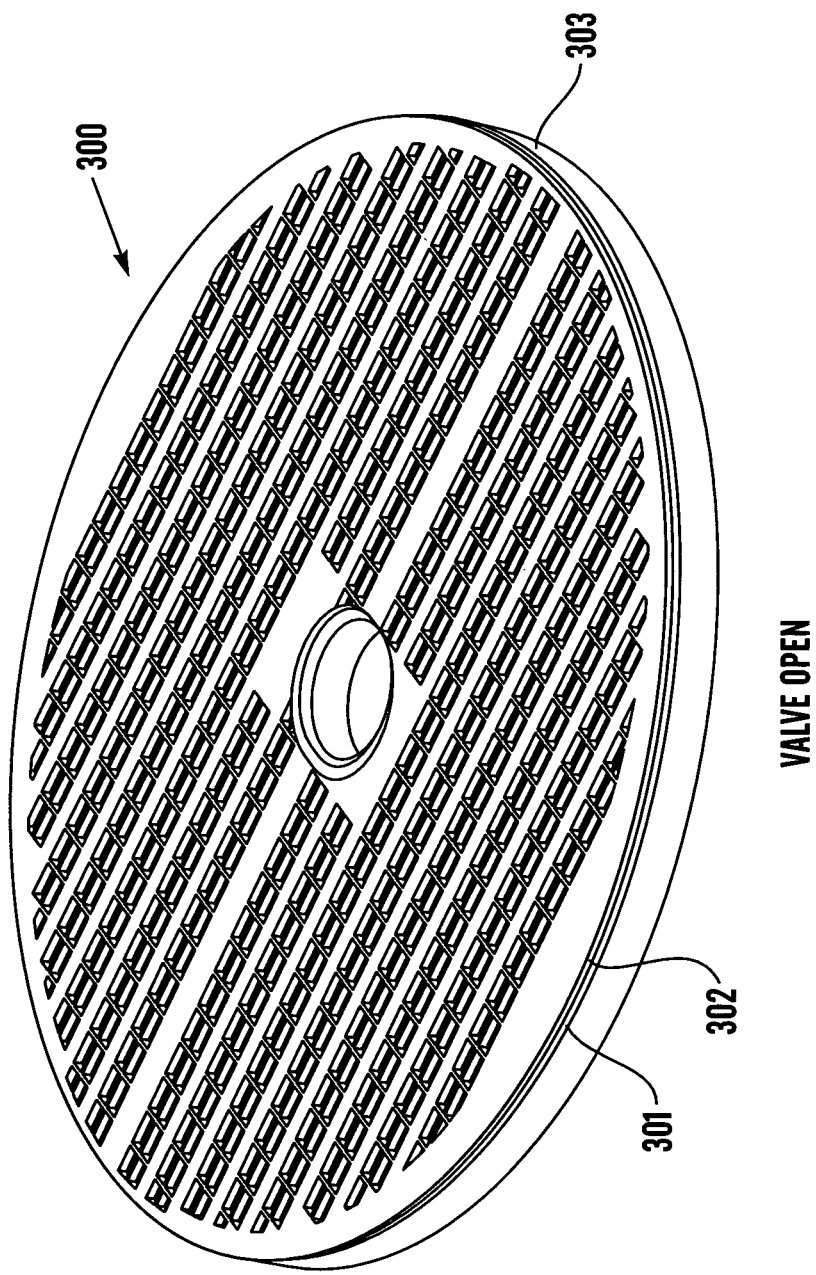
FIG. 8 is a schematic view of a valve comprising the valve plate means and sealing face plate means illustrated in FIGS. 6 and 7 in an open position.
Figure 9:
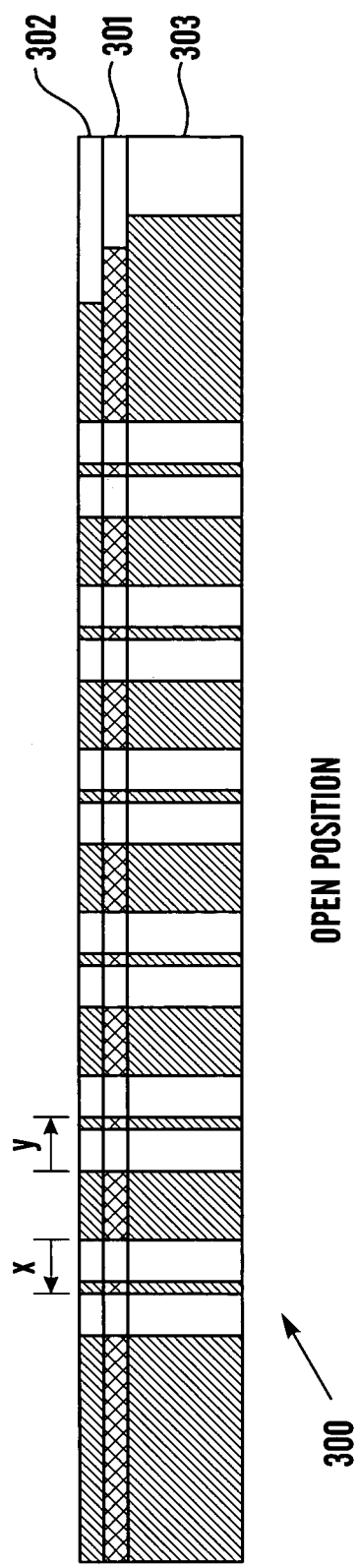
FIG. 9 is a schematic cross-sectional view of the valve of FIG. 8 in the open position.

FIGS. 8 and 9 show valve means 300 in the open position. In order to close the valve it is necessary to move valve plate means 302 a distance x to the left and valve plate means 301 a distance y to the right. In the open position there is no pressure differential across the valve plate means 301 and 302 and they can therefore slide easily over each other and the valve sealing face means 303.

Figure 10:
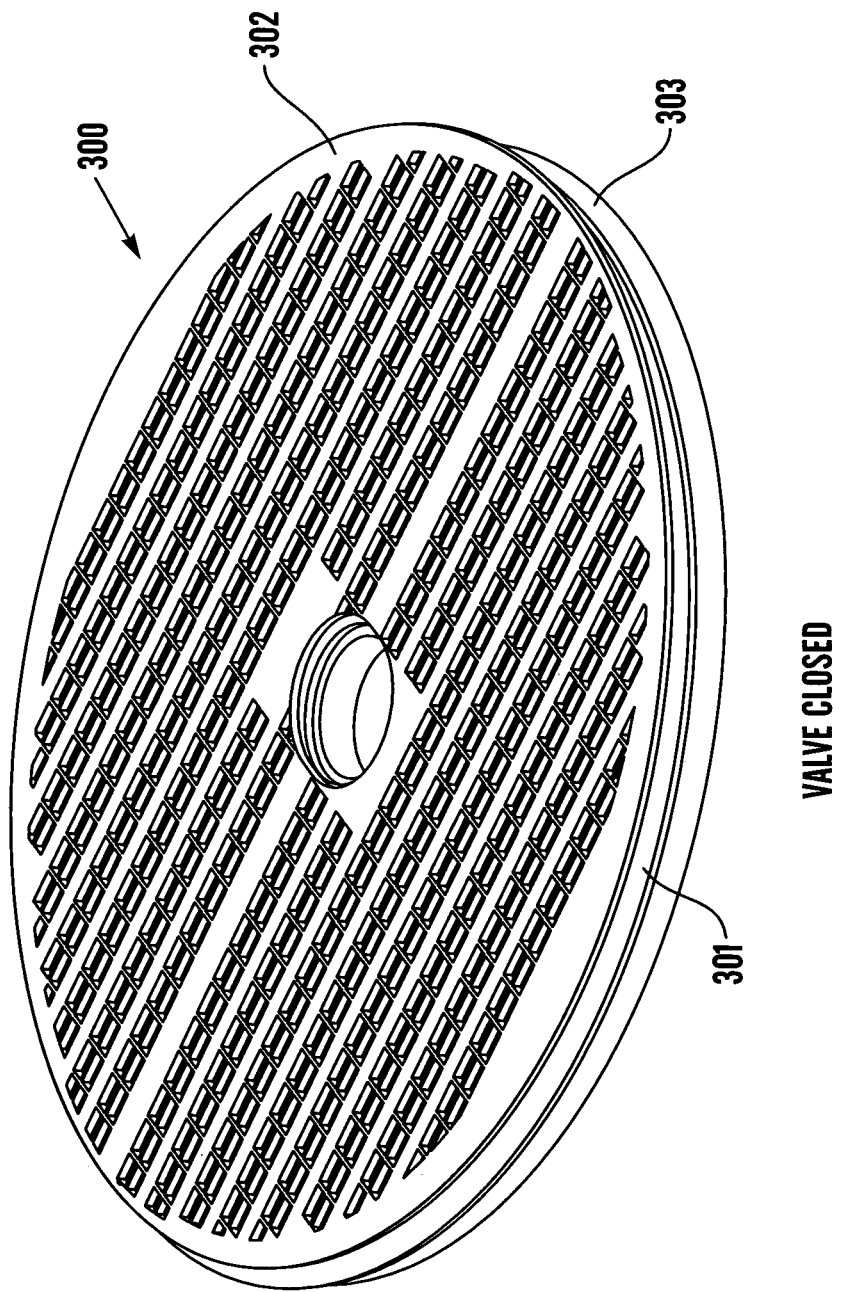
FIG. 10 is a schematic view of the valve of FIG. 8 in a closed position.

FIGS. 10 and 11 show valve means 300 in the closed position. In use there will be a pressure differential across the valve means 300 such that valve plates 302 is forced on to valve plate means 301 which in turn is forced on to valve sealing face means 303. This force will vary with the pressure and will only drop close to zero at or near pressure equalisation across the valve means 300.

In this closed position the valve sealing port means 305 are covered by solid section means 307 of the valve plate means 302 and the valve sealing port means 306 are covered by the solid section means 308 of the valve plate means 301.

FIG. 12a

Figure 12A:
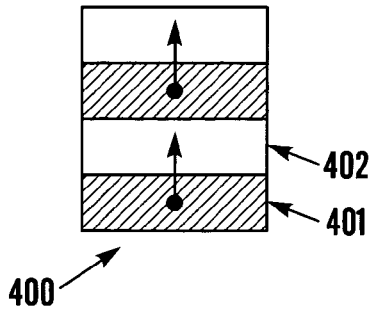
FIGS. 12a, 12b, 12c, 12d, 12e and 12f are schematic plan views showing different multiple linear and rotary valve configurations in a valve in accordance with embodiments of the present invention.

FIG. 12a shows the basic movement action of a single acting valve means 400 where a valve cover means 401 can move in a linear direction as indicated to cover a valve port means 402. The theoretical maximum valve area with this configuration is just less than 50%.

FIG. 12b

Figure 12B:
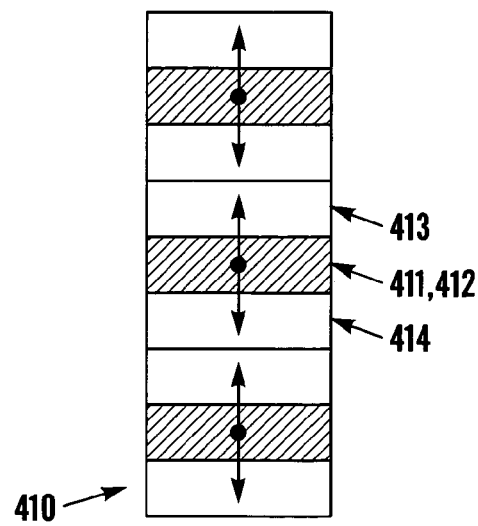
Figure 12C:
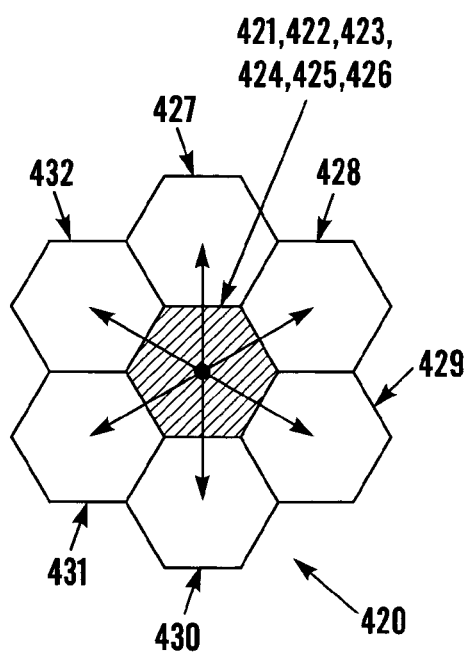

FIG. 12b shows the basic movement action of a double acting valve means 410 where a valve cover means 411 can move in a linear direction as indicated to cover a valve port means 413 and another valve cover means 412 moves in the opposite direction to cover valve port means 414. The theoretical maximum valve area with this configuration is just less than 66.6%.

FIG. 12c

FIG. 12 c shows the basic movement action of a six way linear valve means 420, where valve cover means 421,422, 423,424,425 and 426 move in the indicated directions to cover ports 427,428,429,430,431 and 432. The theoretical maximum valve area with this configuration is just less than 86%.

FIG. 12d

Figure 12D:
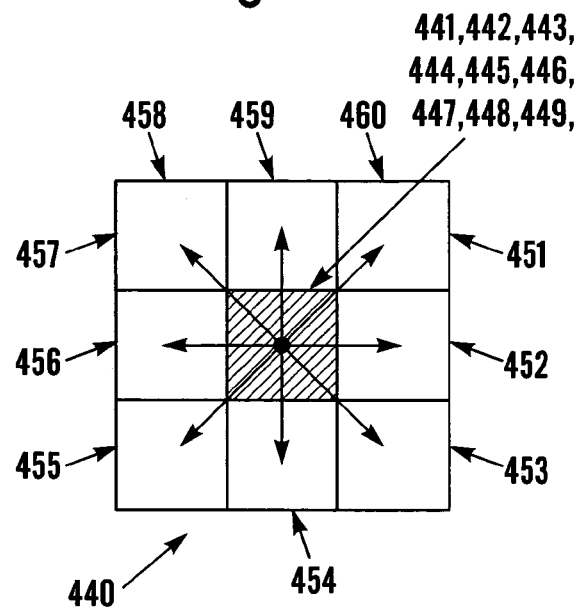

FIG. 12d shows the basic movement action of an eight way linear valve means 440, where valve cover means 441, 442, 443, 444, 445, 446, 447, 448, 449 and 450 move in the indicated directions to cover ports 451, 452, 453, 454, 455, 456, 457, 458, 459 and 460. The theoretical maximum valve area with this configuration is just less than 89%.

FIG. 12e

Figure 12E:
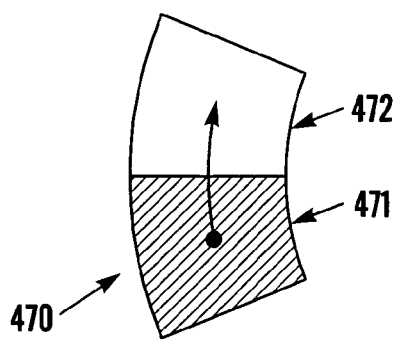

FIG. 12e shows the basic movement action of a single acting rotary valve means 470 where a valve cover means 471 can move in a rotational direction indicated by the arrow to cover a valve port means 472. The theoretical maximum valve area with this configuration is just less than 50%.

FIG. 12f

Figure 12F:
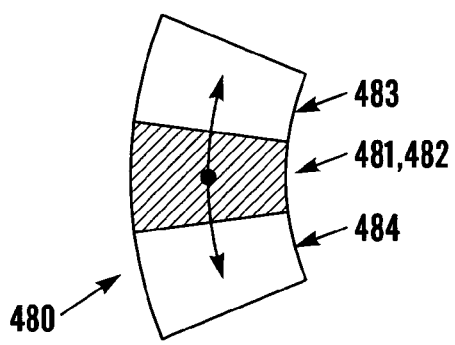

FIG. 12f shows the basic movement action of a double acting rotary valve means 480 where a valve cover means 481 can move in a rotational direction indicated by the arrow to cover a valve port means 483 and another valve cover means 482 moves in the opposite rotational direction to cover valve port means 484. The theoretical maximum valve area with this configuration is just less than 66.6%.

FIGS. 13a and 13b

FIGS. 13a and 13b shows a valve sealing face port means 600 and a port edge means 603. A valve plate means 601 has corner means 602 that may catch on port edge means 602 during operation as both corners have 90 degree corners with no rounding. This is potentially problematic and should be avoided if possible.

FIGS. 13c and 13d

FIGS. 13c and 13d shows a valve sealing face port means 610 and a port edge means 613. A valve plate means 611 has corner means 612 that will not catch on port edge means 613 as this has been over rounded. This is not preferable as the rounding covers the whole of the sealing area and the valve plate means 611 is unlikely to seal properly.

FIG. 13e

FIGS. 13e and 13f shows a valve sealing face port means 620 and a port edge means 623. A valve plate means 621 has corner means 622 that will not catch on port edge means 623 as this has been slightly rounded. In this case where the rounding covers, for example, 5-10% of the sealing area then the valve plate means 621 will still seal. This is likely to be least problematic, however the final degree of rounding is determined by port size, valve plate thickness and valve plate material properties.

FIG. 14

FIG. 14 shows a retaining plate means 501 comprising aperture means 502 that allow free flow of fluid through the ports and cover means 503 that constrain the one or more valve plates (not shown). The retaining plate means 301 has a shallow profile that helps to minimise deadspace.

FIG. 15

FIG. 15 shows a geometric constraint in the form of a restraining stud 700 for restraining movement of valve plate means 710 relative to valve sealing face 720. In FIG. 15, $F_N$ is the normal force on the valve, the product of a local effective area and the pressure differential (F), θ is the angle of the restraining stud at the valve seating surface, $F_o$ is the force to be overcome by the applied opening force (=F tan θ), and D is the direction of the applied opening force.

Screen valves of the type used in the piston of FIG. 1a rely on pressure differentials across the valve to lock the valve closed such that an opening force may be applied ahead of the opening resulting in a rapid opening when the pressure differential approaches zero. Two forms of restraint against opening are available: limiting friction and geometric constraint.

Limiting Friction

The use of limiting friction is appropriate to a non-lubricated valve. Limiting friction provides absolute restraint against motion if the normal force on the valve (generally close to the product of the pressure and the available opening area of the valve) multiplied by the limiting friction coefficient is greater than the imposed opening force applied to slide the valve in its own plane. As an example:

Porosity of valve=30%
Maximum pressure differential for opening=0.01 bar (1000 N/m$^2$)
Limiting friction coefficient=0.35
Total valve opening area;
Diameter of valve=0.3 m $$\text{Opening area of valve} = \frac{\pi \times 0.3^2 \times 0.28}{4} = 0.0198 \text{ m}^2$$

$$\text{Force to open valve at 0.01 bar pressure differential} = 0.0198 \times 1000 \times 0.35$$
$$= 6.93 \text{ N}$$

Since a valve of this type may, typically, be required to work at a 10 bar differential in an engine application this represents operation triggered by cycle gas pressure at 0.1% of cycle peak pressure.

Geometric Constraint

If the valve is to work in a lubricated environment limiting friction may not be available to lock the valve in place as the lubricant will provide a viscous restraint and so the valve may drift open due to the applied opening force.

In this case a restraining stud 700, or group of studs, is provided and the gradient of the stud 700 at the point of contact with the valve plate provides a lateral component of resistance to opening when a pressure differential exists.

Due to valve plate flexibility, the entire valve area may not be effective in providing normal force to resist climbing over the restraining stud and so an "effective area" is now multiplied by the sealing pressure on the plate. When multiplied by the tangent of the stud angle the necessary opening force is found. Steeper stud angles will correspond to greater opening forces and hence to lower pressure differentials at opening. This method of valve locking can work in the absence of useful friction.

FIG. 16

FIG. 16 shows a valve plate means 10" comprising multiple valve plate ports 20' and an integral stiffening member 70' defined by a thicker and hence stiffer localised section of the valve plate means 10".

The invention claimed is:

1. A valve comprising a first part defining a first array of apertures and a second part defining a second array of apertures, the first part comprising a flexible plate-like member and being moveable laterally relative to the second part between a closed configuration in which the first and second arrays of apertures are not registered and passage of a fluid through the valve is substantially prevented and an open configuration in which the first and second arrays of apertures are registered and passage of fluid is allowed;
   wherein the first part is constrained to move substantially parallel to a surface defined by the sealing face of the second part by a retaining plate, and
   wherein the valve is provided on a piston such that the second part comprises a piston face.

2. A valve according to claim 1, wherein the retaining plate comprises a foraminous screen configured to substantially cover the flexible plate-like member.

3. A valve according to claim 1, wherein the retaining plate comprises a substantially planar body.

4. A valve according to claim 1, wherein the valve comprises an expansion valve.

5. A valve according to claim 1, wherein the valve comprises a compression valve.

6. A valve comprising a first part defining a first array of apertures and a second part defining a second array of apertures, the first part comprising a flexible-like member and being moveable laterally relative to the second part between a closed configuration in which the first and second arrays of apertures are not registered and passage of a fluid through the valve is substantially prevented and an open configuration in which the first and second arrays of apertures are registered and passage of fluid is allowed;
   wherein the first part comprises more than one moveable valve plate, which are configured in one layer or in multiple layers, and
   wherein the valve is provided on a piston such that the second part comprises a piston face.

7. A valve according to claim 6, wherein the first part is configured to move linearly relative to the second part.

8. A valve according to claim 6, wherein the first part comprises a pair of moveable plates, each plate of the pair comprising a sub-set of the first array of apertures.

9. A valve according to claim 8, wherein each plate of the pair is configured to seal a different group of apertures in the second array of apertures.

10. A valve according to claim 8, wherein each plate of the pair is configured to seal a different section of the same group of apertures in the second array of apertures.

11. A valve according to claim 8, wherein the pair of moveable plates move in opposite directions to one another as the first part moves between the closed and open configurations.

12. A valve according to claim 8, wherein the first part is configured to move linearly relative to the second part and comprises two further pairs of moveable plates, each pair being associated with a different axis, with each plate in a pair of moveable plates being configured to move in opposite directions along its respective axis.

13. A valve according to claim 8, wherein the first part is configured to move linearly relative to the second part and comprises three further pairs of moveable plates, each pair being associated with a different axis, with each plate in a pair of moveable plates being configured to move in opposite directions along its respective axis.

* * * * *